(12) United States Patent
Hebenstreit et al.

(10) Patent No.: US 9,156,489 B2
(45) Date of Patent: Oct. 13, 2015

(54) SLIDING SLEEVE BLANK AND MOTOR VEHICLE STEERING SPINDLE ASSEMBLY HAVING A SLIDING SLEEVE MADE FROM THE BLANK

(75) Inventors: Axel Hebenstreit, Stuttgart (DE); Marco Schwieger, Hamburg (DE)

(73) Assignee: Daimler AG, Stuttgart (DE)

( * ) Notice: Subject to any disclaimer, the term of this patent is extended or adjusted under 35 U.S.C. 154(b) by 165 days.

(21) Appl. No.: 13/880,130

(22) PCT Filed: Oct. 13, 2011

(86) PCT No.: PCT/EP2011/005147
§ 371 (c)(1),
(2), (4) Date: May 21, 2013

(87) PCT Pub. No.: WO2012/052135
PCT Pub. Date: Apr. 26, 2012

(65) Prior Publication Data
US 2013/0228034 A1 Sep. 5, 2013

(30) Foreign Application Priority Data
Oct. 21, 2010 (DE) .......................... 10 2010 049 106

(51) Int. Cl.
*B62D 1/184* (2006.01)
*B62D 1/185* (2006.01)
*B21C 23/18* (2006.01)
*B62D 1/16* (2006.01)
(Continued)

(52) U.S. Cl.
CPC ............... *B62D 1/185* (2013.01); *B21C 23/18* (2013.01); *B62D 1/16* (2013.01); *B62D 1/20* (2013.01); *F16C 3/03* (2013.01)

(58) Field of Classification Search
CPC ................................. B65D 1/184; B65D 1/185
USPC ..................................................... 74/492–493
See application file for complete search history.

(56) References Cited

U.S. PATENT DOCUMENTS

| 6,099,036 A * | 8/2000 | Fujiu et al. ..................... 280/777 |
| 6,149,526 A | 11/2000 | Boersma et al. |
| 2004/0034981 A1* | 2/2004 | Harms et al. .................. 29/421.1 |

(Continued)

FOREIGN PATENT DOCUMENTS

| DE | 197 50 005 C1 | 4/1999 |
| DE | 10 2005 033 188 A1 | 1/2007 |

(Continued)

OTHER PUBLICATIONS

International Search Report dated Jul. 25, 2013 with English transation (five (5) pages).

(Continued)

*Primary Examiner* — James English
(74) *Attorney, Agent, or Firm* — Crowell & Moring LLP

(57) ABSTRACT

A sliding sleeve blank for producing a sliding sleeve for a steering spindle shaft of a motor vehicle steering spindle and the motor vehicle steering spindle assembly are provided. The sliding sleeve blank has a cylindrical form and has a section on one end, which has a collar, from which winged webs extending away radially extend in the direction of the second end. The sliding sleeve blank is a cold impact extrusion component, which, at the section has a preliminary toothing system extending over one part of the length of the section.

10 Claims, 3 Drawing Sheets

Figure 1:
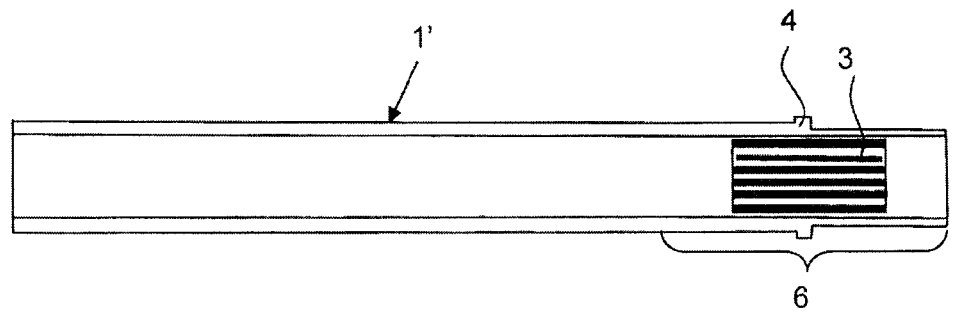

(51) Int. Cl.
*B62D 1/20* (2006.01)
*F16C 3/03* (2006.01)

(56) References Cited

U.S. PATENT DOCUMENTS

| | | | |
|---|---|---|---|
| 2005/0044980 A1* | 3/2005 | Minamoto et al. | 74/493 |
| 2005/0194775 A1* | 9/2005 | Bastein et al. | 280/775 |
| 2006/0213244 A1* | 9/2006 | Brissette | 72/46 |
| 2007/0157754 A1* | 7/2007 | Yamada | 74/493 |
| 2009/0145257 A1* | 6/2009 | Miyawaki et al. | 74/493 |
| 2011/0030496 A1* | 2/2011 | Tokioka | 74/492 |
| 2012/0160051 A1* | 6/2012 | Walser | 74/492 |

FOREIGN PATENT DOCUMENTS

| | | |
|---|---|---|
| GB | 2 167 165 A | 5/1986 |
| GB | 2 296 071 A | 6/1996 |

OTHER PUBLICATIONS

German-language International Preliminary Report on Patentability (PCT/ISA/237) dated Aug. 15, 2013 (seven (7) pages).

* cited by examiner 11,2
10

12
11
10

SLIDING SLEEVE BLANK AND MOTOR VEHICLE STEERING SPINDLE ASSEMBLY HAVING A SLIDING SLEEVE MADE FROM THE BLANK

BACKGROUND AND SUMMARY OF THE INVENTION

Exemplary embodiments of the present invention relate to a sliding sleeve blank suitable for creating sliding sleeves for steering spindle shafts of motor vehicle steering spindle assemblies and the motor vehicle steering spindle assemblies themselves.

Known steering spindle assemblies have a steering spindle shaft, which has a shaft section with an external toothing system at its end, and a sliding sleeve, which has an internal toothing system over a large part of its length. The internal toothing system of the sliding sleeve is geared moveably with the external toothing system of the steering spindle shaft in the steering spindle assembly. To achieve as direct a steering torque transfer of the steering spindle as possible, while at the same time creating a connection between the sliding sleeve and the steering spindle shaft, which functions quietly during operation, the steering spindle shaft is typically coated with plastic.

It is known to produce the toothing system of the sliding sleeve by hammering, which achieves a highly precise configuration of the gearing. During the hammering, a pin with a toothed contour is inserted into the hollow sliding sleeve; then the sleeve is acted on radially from the outside by hammering, wherein the inner contour of the sleeve receives the toothing contour of the pin, while the cross-section of the sleeve is reduced at the same time. The external contour of the sleeve remains smooth.

For constructional reasons, such sliding sleeves are equipped with a collar at its end facing away from the direction of the torsional damper in an assembled state, on the connection of which winged webs are provided, by means of which the sleeve is immersed into corresponding recesses of the torsional damper located on one end of the steering spindle assembly. In this way, the sleeve adopts a defined angular position.

The collar, which forms a contact at the torsional damper, is located in the section until the preparation for being acted on by means of hammering. No hammering from the outside can operate in the region in which the wings and the collar are present.

Thus, the sliding sleeve arising due to the above-described toothing system is restricted with respect to the sliding path. This is therefore disadvantageous, since, when the engine is being fitted into the vehicle, the steering spindle is to be withdrawn as far as possible so that it does not collide with the engine. In this instance, the rotational angle position must remain in a maintained state at the same time, so that assembly of the steering spindle on the steering gear is unhindered.

If, however, the steering spindle is withdrawn accordingly, this requirement cannot be fulfilled since, due to the lack of internal toothing system at the one end of the sliding sleeve, the steering spindle can be freely rotated.

Essentially, hollow cylindrical precision parts made from metal can be reshaped in cold impact extrusion instead of by hammering. Such a method is disclosed in German Patent Publication DE 10 2005 033 188 A1. Here, bar stock is used as the raw material and, after this has been trimmed, a raw component is produced, which has its external lateral area trimmed and has an inner bore-hole added to it. The raw part is reshaped with a desired inner and outer geometry by cold impact extrusion and an external toothing system is provided.

A length-adjustable steering spindle, which enables withdrawal of the same during the assembly of the engine, is also disclosed in German Patent Publication DE 19 750 005 C1. Here, the length-adjustable steering spindle has at least two raw pieces that are arranged coaxially and that are axially displaceable, wherein one of them is mounted to transfer a torsional moment by positive engagement. The outer and inner peripheral contours of the inner and outer profile are formed by curved sections with alternating radii of curvature; a circumferential gap space is present between both profiles. A gliding sleeve made from macro-molecular material is received in the gap space, which rests against the walls of the profile that delineate the gap space along its peripheral contour only in sections and according to choice. The gliding sleeve rests alternatingly on convex sections of the inner profile and on concave sections of the outer profile.

Exemplary embodiments of the present invention provide a steering spindle assembly that can be constructed in a simple and cost-effective manner, which still enables the retention of a rotational angle position of the spindle on the steering gear during axial displacement of the steering spindle at the sliding sleeve.

In order to create a motor vehicle steering spindle assembly according to the invention, first a sliding sleeve blank is provided according to the invention, which enables a sliding sleeve for a steering spindle shaft of a motor vehicle steering spindle assembly to be provided. The blank has a cylindrical shape and has a section on its one end, which comprises a circumferential collar and winged webs extending radially away from the collar to the end of the sleeve.

The sliding sleeve blank according to the invention is now a cold impact extrusion component, which has been directly obtained during the creation of an internal toothing system, which extends over part of the length of the above-mentioned section. This section is indeed any section that cannot be acted on by hammering.

In this way, a component is now provided by the sliding sleeve blank according to the invention, which, during further action by means of hammering, can be reshaped into a sliding sleeve in a known manner, which has a further, hammered toothing system.

The sliding sleeve made from the sliding sleeve blank according to the invention therefore now has two internal toothing systems: a first, which extends from the section having one of the sliding sleeves to the section having the collar, wherein this internal toothing system is producing by hammering, and a second, so-called preliminary toothing system, which is present in the section that rests on the second end. A sliding sleeve thus has been created having an internal toothing system over virtually its entire length and that, in this respect, enables a longer, controlled sliding path for a steering spindle shaft to be prepared.

A motor vehicle steering spindle assembly according to the invention comprises such a steering spindle shaft with an external toothing system, which is part of the steering spindle, in which the steering spindle shaft can be received in an axially displaceable manner. The sliding sleeve is advantageously made from a sliding sleeve blank according to the invention and thus has the known hammered internal toothing system, which extends from the one first end of the sliding sleeve in the direction of a section that is near to the second end of the sleeve, which section has the collar and the winged webs that extend radially away. In one installation position of the steering spindle assembly, the hammered internal toothing system is in sliding engagement with the external toothing system of the steering spindle shaft.

Furthermore, the steering spindle shaft according to the invention has a preliminary toothing system according to the invention over one part of the length of the cited section, which is geared with the external toothing system in one assembly position of the steering spindle shaft. Here, a rotational angle position, which has engaged the steering spindle shaft with the toothing system in the installation position, or which was positioned with the steering spindle shaft, is retained by transferring the steering spindle shaft from the hammered internal toothing system to the preliminary toothing system.

The length of the external toothing system of the steering spindle shaft can be selected in such an advantageous way that the steering spindle shaft is guided without interruption through the hammered internal toothing system and through the preliminary toothing system of the sliding sleeve during the transfer from the installation position to the assembly position.

The external toothing system of the steering spindle shaft can be provided by a plastic coating.

Furthermore, the preliminary toothing system of the steering spindle shaft can have such a tooth size that a tolerance compensation gap is provided between the preliminary toothing system and the external toothing system in the assembly arrangement. Production tolerances, such as those that arise due to cold impact extrusion, are hereby compensated for.

A further possibility for the compensation of production tolerances can be created by the fact that the toothing system has a missing tooth in the sliding sleeve in the hammered region. In the hammered region, the steering spindle shaft can then have a block tooth. In the preliminary toothing region of the sliding sleeve, there is, however, only one missing tooth.

These and other advantages are demonstrated by the description below with reference to the accompanying figures.

BRIEF DESCRIPTION OF THE DRAWING FIGURES

The reference to the figures in the description serves to support the description and to facilitate understanding of the subject matter. Subject matters or parts of subject matters that are essentially the same or similar can have the same reference numerals added to them. The figures are only a schematic depiction of an embodiment of the invention.

Figure 2:
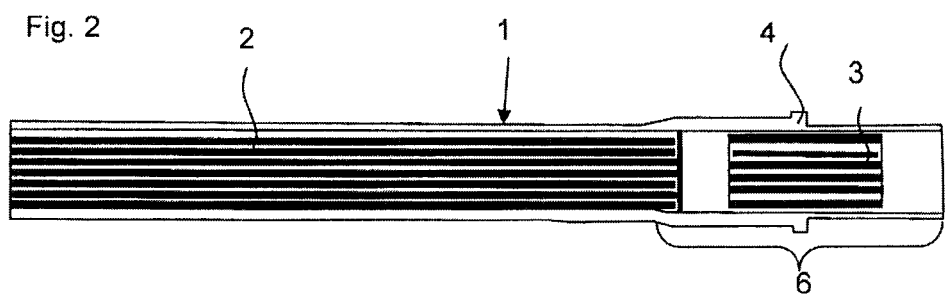
Figure 3:
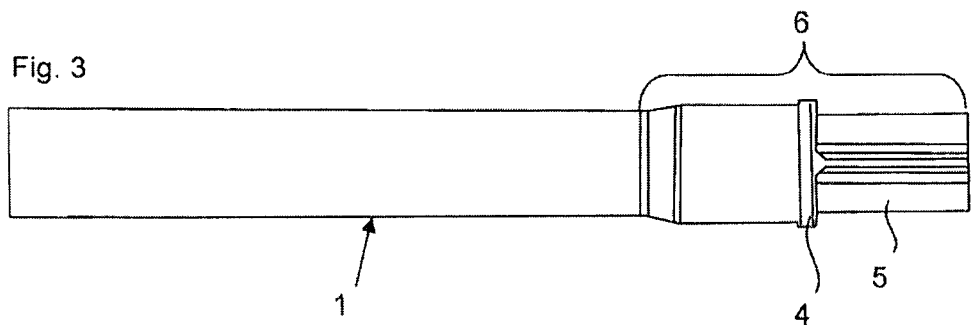
Figure 4:
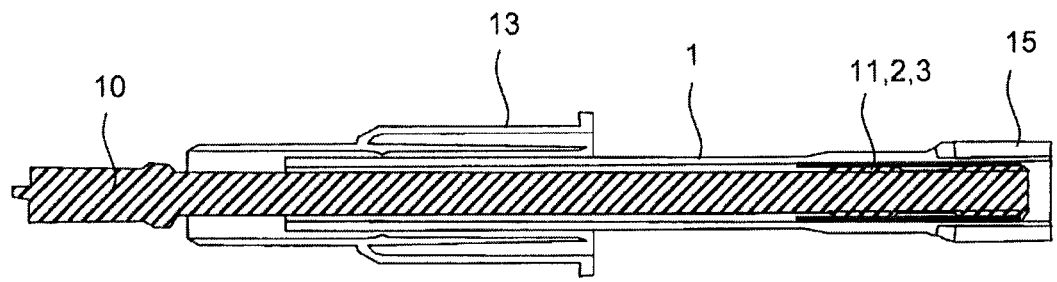
Figure 5A:
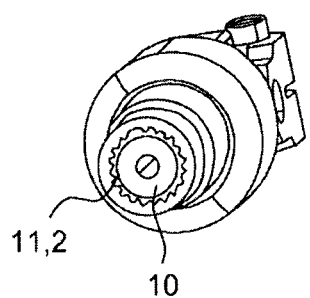
Figure 5B:
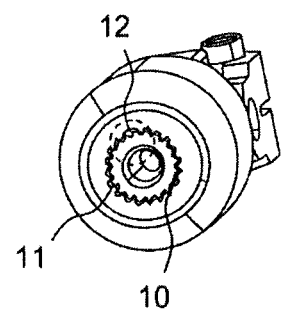
Figure 5C:
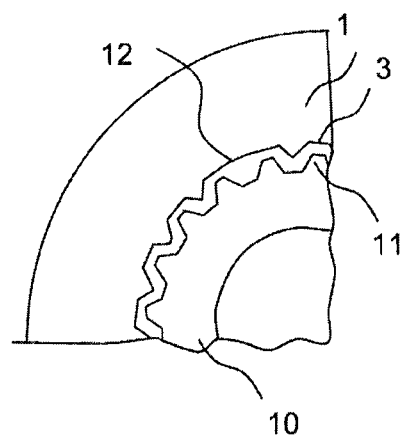

Here are shown:

FIG. 1 a longitudinal section view of a sliding sleeve blank according to the invention, FIG. 2 a longitudinal section view of a sliding sleeve according to the invention, FIG. 3 a longitudinal view of the sliding sleeve according to the invention, FIG. 4 a longitudinal section view of a sliding sleeve according to the invention, into which a steering spindle shaft is inserted, FIG. 5a a perspective top view onto the toothing system of the sliding sleeve in the hammered region, FIG. 5b a perspective top view onto the preliminary toothing system, FIG. 5c a detailed view from FIG. 5b, FIGS. 6a-6c respectively illustrate the installation position, transfer from the installation position to the assembly position, and the assembly position.

DETAILED DESCRIPTION

FIG. 1 shows a sliding sleeve blank 1' according to the invention, which is suitable for being finished into a sliding sleeve 1, as is depicted in FIG. 1 in a side sectional view and in FIG. 2 in the side view. The sliding sleeve blank is a cold impact extrusion component that is set up as a hollow cylinder and has a section on its one end in which a collar 4 is provided, from which winged webs 5 extend radially away up to the end, as is shown in FIG. 3.

The complete sleeve, as is shown in FIGS. 2 to 4, is immersed into the torsional damper 15 denoted in FIG. 4 by means of the winged webs. To that end, corresponding recesses are provided in the torsional damper 15, which are brought into contact with the winged webs 5, whereby the sleeve 1 adopts a defined angle position. The collar 4 here forms contact at the torsional damper, as is also demonstrated in FIG. 4.

As is already known from the prior art, the sliding sleeve 1 itself has a hammered internal toothing system 2, which is inserted into the sliding sleeve blank 1' as follows: by means of the known hammering process, the internal toothing system 2 can be produced to a high level of precision, while a pin with a toothed contour is inserted into the hollow sliding sleeve blank 1'. Now, the blank 1' can be acted on radially from the outside, wherein the inner contour of the sleeve receives the toothing contour of the pin. Here, the cross-section of the blank 1' is reduced and receives the shape of the completed sleeve 1, as is shown in FIGS. 2-4. For constructive reasons, a transfer region arises during the hammering, such that the cross-section of the sleeve 1 that is now reduced by hammering expands in the direction of the collar 4 in a minorly funnel-shaped manner.

This transfer region above the collar to the end of the sleeve 1', which bears the winged webs 5, is described below as section 6. In this section, no internal toothing system can be produced by means of hammering. Therefore, according to the invention, the sliding sleeve blank 1' is produced directly as a cold impact extrusion component, which, at the section 6, has a preliminary toothing system 3 extending above the largest part of the length of the section 6. The term "preliminary toothing system" expresses the notion that this first toothing system 3 was produced before the hammered internal toothing system 2.

Thus, according to the invention, a sleeve 1 can be produced, which has an internal toothing system comprising hammered toothing system 2 and preliminary toothing system 3 over virtually its entire length, wherein an extended sliding seat, comprising an external toothing system 11, hammered toothing system 2, and preliminary toothing system 3 of the steering spindle assembly according to the invention arises, wherein the steering spindle shaft 10 is inserted into the sliding sleeve 1, which is a section of the steering spindle and which has an external toothing system 11, and is inserted into the section with the hammered internal toothing system 2 of the sliding sleeve 1 in an axially displaceable manner (see FIG. 4).

The meaning of this improved sliding part arises from the fact that, when the engine is being fitted into the vehicle, to avoid a collision of the steering spindle with the engine, the steering spindle is to be withdrawn as far as possible. The preset, defined rotational angle position of the steering spindle must, however, remain maintained for unhindered assembly of the spindle on the sliding sleeve. This can only be guaranteed if the steering spindle shaft is guided in the sliding sleeve at all times. This requirement is achieved by the motor vehicle steering spindle assembly according to the invention, which provides a sliding sleeve 1 with a virtually integrated internal toothing system 2, 3. In this way, the steering spindle, after having been inserted into the sliding sleeve 1, is no longer freely rotatable at any point in time. Here, it is conceivable for the internal toothing system 3 to consist of two diametrically opposite teeth respectively in a simple construction type, wherein the teeth of each pair are located relatively close to one another, such that each tooth of the external toothing system 11 can be brought into engagement with clearance with the tooth space between both teeth.

Figure 6A:
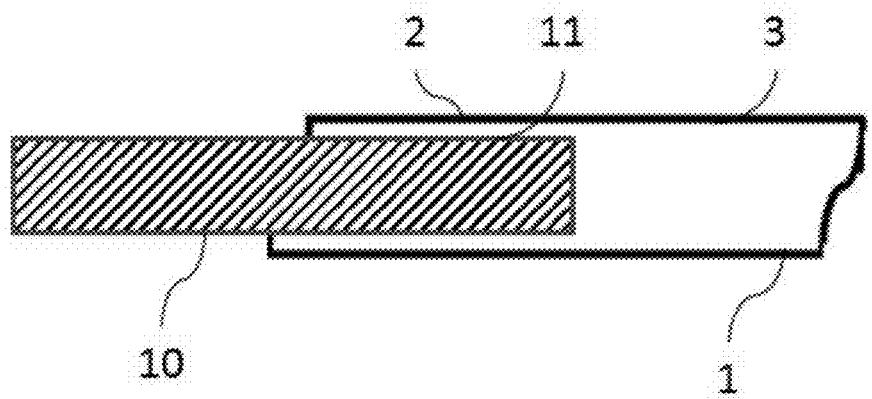
Figure 6B:
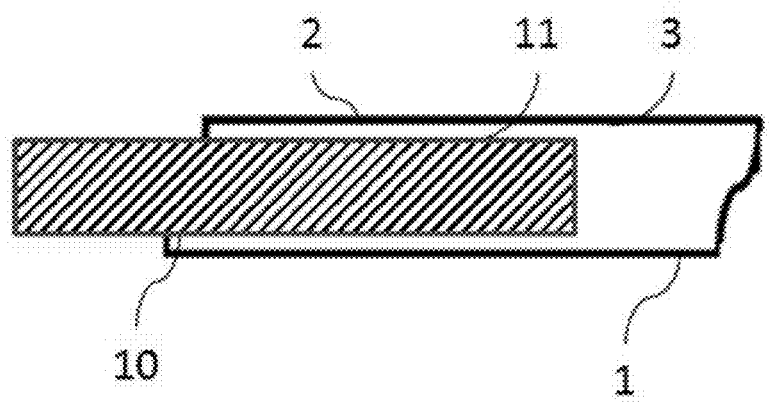
Figure 6C:
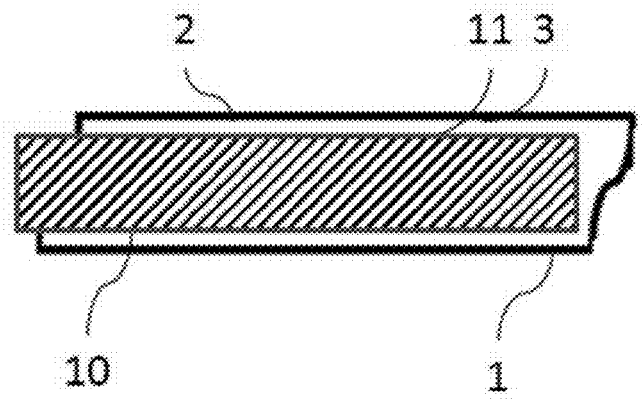

This arises because, in one installation position of the steering spindle assembly (as schematically illustrated in FIG. 6*a*), the hammered internal toothing system 2 is geared with the external toothing system 11 of the steering spindle shaft 10, and that, during the transfer to the assembly position of the engine has schematically illustrated in FIG. 6*b*), in which the withdrawn steering spindle shaft in the sliding sleeve 1 is moved in the direction of the torsional damper 15, the steering spindle shaft 10 is moved again directly from the hammered internal toothing system 2 of the sliding sleeve 1 to the preliminary toothing system 3 (as schematically illustrated in FIG. 6*c*). It thus has an elongated sliding path, wherein secured guiding is provided at the same time. As is known to the person skilled in the art, a desired restriction to the sliding path can be created, for example, by the arrangement of a stop ring for the assembly, which is arranged extensively around the steering spindle shaft.

As is further shown by FIG. 4, the sleeve 1 is surrounded locally by a sealing ring 13, on which a sealing member sits in a sliding manner, which seals the passage of the steering spindle assembly through the front wall of the motor vehicle cockpit from engine heat and sound.

FIG. 5 shows the hammered internal toothing system of the sliding sleeve 1, which presently has a missing tooth 12, in order to provide a certain level of clearance to compensate for production tolerances. A block tooth, which is not shown in the figures, can be provided on the steering spindle shaft 1 as a corresponding element to the missing tooth. Given that the steering spindle shaft 1 has a plastic coating that can also provide the toothing, the block tooth can be made from plastic. Such a plastic coating is in particular advantageous as a way of transferring the steering torque as directly as possible and producing as quiet a connection as possible between the steering spindle and the sliding sleeve.

As is further shown in FIG. 5*b*, a missing tooth 12 can also be present in the sliding sleeve 1 in the region of the preliminary toothing system. With this, and due to a larger toothing system 3 in section 6, production tolerances can be compensated for, which can thus be necessary since the cold forming of the sliding sleeve blank can produce, if necessary, a preliminary toothing system as a cold impact extrusion component, which is completed less precisely than the internal toothing system created by hammering.

The detailed view in FIG. 5*b* shows that, due to correspondingly selected tooth sizes 3, 11 in the sliding sleeve 1 and the tolerance compensation gap arising thus, which it still provides despite the secured guiding, a certain level of clearance arises in order to withstand the cited production tolerances.

Now, in this way, maintaining the desired rotational angle position is ensured at all times with the motor vehicle steering spindle assembly according to the invention during the transfer of the steering spindle from the installation position to the assembly position.

Furthermore, the elongated sliding path according to the invention supports the compensation of vehicle tolerances, such that fewer movements can be compensated for during the driving operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A sliding sleeve blank for producing a sliding sleeve for a steering spindle shaft of a motor vehicle steering spindle, wherein the sliding sleeve blank comprises:
   a cylindrical form;
   a section on one end, which has a collar from which winged webs extending away radially extend in a direction of the one end,
   wherein the sliding sleeve blank is a cold impact extrusion component, which, at the section, has a preliminary toothing system extending laterally beyond the collar and onto a portion of the winged webs.

2. The sliding sleeve blank according to claim 1, further comprising:
   a hammered internal toothing system extending from the preliminary toothing system towards a second end of the blank, wherein the second end is opposite of the one end.

3. The sliding sleeve blank according to claim 2, wherein the hammered internal toothing system has a different number of teeth than the preliminary toothing system.

4. A motor vehicle steering spindle assembly, comprising:
   a steering spindle shaft with an external toothing system; and
   a sliding sleeve configured to receive the steering spindle shaft, the sliding sleeve including an internal toothing system,
   wherein the internal toothing system of the sliding sleeve has a hammered internal toothing system, which extends from a first end of the sliding sleeve in a direction of a section near a second end, which has a collar, from which winged webs extending away radially extend in the direction of the second end,
   wherein, in one installation position of the steering spindle assembly, the hammered internal toothing system is toothed with the external toothing system of the steering spindle shaft,
   wherein the internal toothing system of the sliding sleeve has a preliminary toothing system over one part of a length of the section, which is toothed with the external toothing system in an assembly position of the steering spindle shaft, and
   wherein a relative angle between the steering spindle shaft and the sliding sleeve is maintained by engagement between the steering spindle shaft with the internal toothing system of the sliding sleeve in the installation position by transferring the steering spindle shaft from the hammered internal toothing system to the preliminary toothing system,
   wherein the preliminary toothing system extends laterally beyond the collar and onto a portion of the winged webs.

5. The motor vehicle steering spindle assembly according to claim 4, wherein a length of the external toothing system of the steering spindle shaft is selected in such a way that the steering spindle shaft is guided without interruption through the hammered internal toothing system and through the preliminary toothing system of the sliding sleeve during the transfer from the installation position to the assembly position.

6. The motor vehicle steering spindle assembly according to claim 4, wherein the external toothing system of the steering spindle shaft has a plastic coating.

7. The motor vehicle steering spindle assembly according to claim 4, wherein the preliminary toothing system of the sliding sleeve has a tooth size that provides a tolerance compensation gap between the preliminary toothing system and the external toothing system in the assembly position.

8. The motor vehicle steering spindle assembly according to claim 4, wherein the hammered internal toothing system and the preliminary toothing system of the sliding sleeve have at least one missing tooth, the external toothing system of the steering spindle shaft has at least one block tooth, and positioning of the block tooth is selected with reference to the missing tooth and in reference to a predetermined rotational angle position of the steering spindle shaft.

9. The motor vehicle steering spindle assembly according to claim 4, wherein the hammered internal toothing system has a different number of teeth than the preliminary toothing system.

10. A method comprising:
producing, using cold impact extrusion, a cylindrical sliding sleeve blank with an internal preliminary toothing system on a first portion; and
producing, using a hammering process, a hammered internal toothing system on a second portion adjacent to the first portion,
wherein the hammering process forms a collar,
wherein the produced cylindrical sliding sleeve blank includes winged webs extending from the collar to a first end,
wherein the internal preliminary toothing system extends laterally beyond the collar onto a portion of the winged webs, and
wherein the cold impact extrusion is performed prior to the hammering process.

\* \* \* \* \*